(12) United States Patent
Preppernau et al.

(10) Patent No.: US 8,343,563 B2
(45) Date of Patent: Jan. 1, 2013

(54) EGG-FILLED FOOD PRODUCT

(75) Inventors: Brent Preppernau, St. Cloud, MN (US); Brian Thon, Coon Rapids, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 13/011,534

(22) Filed: Jan. 21, 2011

(65) Prior Publication Data

US 2011/0117253 A1 May 19, 2011

Related U.S. Application Data

(63) Continuation of application No. 11/004,007, filed on Dec. 3, 2004, now abandoned.

(51) Int. Cl.
*A23L 1/32* (2006.01)
(52) U.S. Cl. ......... 426/552; 426/94; 426/275; 426/614
(58) Field of Classification Search ............... None
See application file for complete search history.

(56) References Cited

U.S. PATENT DOCUMENTS

| | | |
|---|---|---|
| 1,597,979 A | 8/1926 | James et al. |
| 3,767,823 A | 10/1973 | Wheeler et al. |
| 4,146,652 A | 3/1979 | Kahn et al. |
| 4,154,863 A | 5/1979 | Kahn et al. |
| 4,207,348 A | 6/1980 | Vermilyea et al. |
| 4,235,939 A | 11/1980 | Kimberly et al. |
| 4,350,711 A | 9/1982 | Kahn et al. |
| 4,353,932 A | 10/1982 | Bone |
| 4,421,770 A | 12/1983 | Wiker et al. .............. 426/89 |
| 4,451,491 A | 5/1984 | Trop et al. |
| 4,469,708 A | 9/1984 | Rapp et al. |
| 4,508,736 A | 4/1985 | Bean et al. |
| 4,588,600 A | 5/1986 | Suderman |
| 4,675,197 A | 6/1987 | Banner et al. ............ 426/292 |
| 4,753,813 A | 6/1988 | Saadia |
| 5,009,903 A | 4/1991 | deFigueiredo et al. |
| 5,145,699 A | 9/1992 | D'fjkshoorn et al. |
| 5,289,761 A | 3/1994 | Spierts et al. |
| 5,384,144 A | 1/1995 | Bedard et al. |
| 5,482,722 A | 1/1996 | Cook |
| 5,620,735 A | 4/1997 | Manderfeld et al. |
| 5,665,416 A | 9/1997 | Manderfeld et al. |
| 5,830,519 A | 11/1998 | Telfer et al. |
| 5,968,570 A | 10/1999 | Paulucci |
| 6,020,008 A | 2/2000 | Li et al. |
| 6,146,573 A | 11/2000 | Shogren et al. |
| 6,159,514 A | 12/2000 | Brummett et al. |
| 6,210,723 B1 | 4/2001 | Coleman et al. |
| 6,261,625 B1 | 7/2001 | Pickford |
| 6,267,998 B1 | 7/2001 | Bauman et al. |
| 6,406,731 B1 | 6/2002 | Hartman |
| 6,503,546 B1 | 1/2003 | Ferrari-Philippe et al. |

(Continued)

FOREIGN PATENT DOCUMENTS

CN 1751580 A 3/2006

(Continued)

OTHER PUBLICATIONS

Abstract of Japanese Patent No. JP 11-127824; date of publication May 18, 1999 (1 pg.).

(Continued)

*Primary Examiner* — Lien Tran

(57) ABSTRACT

Disclosed herein is a food product that includes a filling and a coating. The filling typically includes cooked egg material. The coating typically includes a cooked, non-yeast leavened batter.

14 Claims, 3 Drawing Sheets

U.S. PATENT DOCUMENTS

| | | | |
|---|---|---|---|
| 6,858,238 B2 | 2/2005 | Lee et al. | |
| 8,088,427 B2 | 1/2012 | Engleson et al. | |
| 2002/0068115 A1 | 6/2002 | Hayes-Jacobson | |
| 2004/0047950 A1 | 3/2004 | Gambino et al. | |
| 2004/0067283 A1 | 4/2004 | Hudson et al. | 426/94 |
| 2004/0076733 A1 | 4/2004 | Sanderson et al. | |
| 2004/0115327 A1 | 6/2004 | Allouche | |
| 2004/0175487 A1 | 9/2004 | Allouche et al. | |
| 2005/0158446 A1 | 7/2005 | Lester et al. | |
| 2005/0175756 A1 | 8/2005 | Fukasawa | |
| 2005/0202151 A1 | 9/2005 | Tillis | 426/614 |
| 2006/0121160 A1 | 6/2006 | Preppernau et al. | |
| 2006/0280840 A1 | 12/2006 | Robertson | |
| 2006/0286240 A1 | 12/2006 | Roosjen | |
| 2007/0031564 A1 | 2/2007 | Fontanesi et al. | |
| 2007/0116846 A1 | 5/2007 | Singh-Meneghini | |
| 2009/0092716 A1 | 4/2009 | Atwell et al. | |
| 2009/0098270 A1 | 4/2009 | Engleson et al. | |
| 2011/0117253 A1 | 5/2011 | Preppernau et al. | |

FOREIGN PATENT DOCUMENTS

| | | |
|---|---|---|
| DE | 195 24 209 A1 | 1/1998 |
| EP | 35978 A2 | 9/1981 |
| EP | 191 250 B1 | 10/1991 |
| EP | 872188 A2 | 10/1998 |
| EP | 1433383 A | 6/2004 |
| FR | 2 774 864 A1 | 2/1998 |
| GB | 201 100 | 7/1923 |
| GB | 2245 138 A | 1/1992 |
| JP | 56048855 A2 | 5/1981 |
| JP | 1 0099024 | 4/1998 |
| JP | 10099024 | 4/1998 |
| JP | 11127824 | 5/1999 |
| JP | 2000236803 A2 | 9/2000 |
| RU | 2295244 C1 | 2/2007 |
| SE | 525048 C2 | 11/2004 |
| UA | 70089 | 4/2004 |
| WO | WO 91/08671 | 6/1991 |
| WO | 01/19195 A1 | 3/2001 |
| WO | WO 01/35751 A1 | 5/2001 |
| WO | WO 2004/008883 A1 | 1/2004 |
| WO | 2005/034977 A1 | 4/2005 |
| WO | 2005/046334 A1 | 5/2005 |
| WO | 2005/079597 A1 | 9/2005 |
| WO | 2006/060812 | 6/2006 |
| WO | 2008022092 A2 | 2/2008 |
| WO | 2009/009146 | 1/2009 |
| WO | 2010/005419 | 1/2010 |
| WO | 2011/084978 | 7/2011 |

OTHER PUBLICATIONS

PCT International Search Report based on International Application No. PCT/US2005/044103, Date of Mailing of the International Search Report Apr. 18, 2006 (3 pgs.).

Atwell, William A., "Flour Additives", Wheat Flour Practical Guides for the Food Industry, pp. 41-42.

Atwell, William A., "Products from Soft Wheat Flour: Problems, Causes, and Resolutions", Wheat Flour Practical Guides for the Food Industry, pp. 97-98, 100-104, 107-108, undated.

Croissant Pockets, Ingredients, 1 pg., undated.

PCT International Search Report PCT/US2001/020180 mailed Mar. 23, 2011. 1 page.

PCT International Search Report PCT/US2007/75842 mailed Jun. 11, 2008. 1pages.

PCT International Search Report PCT/US2008/008565 mailed Oct. 24, 2008. 3 pages.

PCT International Search Report PCT/US2008/014083 mailed Apr. 29, 2009. 3 pages.

Abstract of German Patent No. DE19524209(A1); Feb. 1, 1996, 1 page. (Abstract Only).

Abstract of French Patent No. FR2774864(A1.); Aug. 20, 1999. 1 page. (Abstract Only).

Abstract of Japanese Patent No. JP56-048855A2; May 2, 1981. 1 page.

Abstract of Japanese Patent No. JP2000236803(A); Sep. 5, 2000. 1 page.

Abstract of Chinese Patent No. CN1751580A; Mar. 29, 2006. 1 page.

Abstract of Russian Patent No. RU2295244(C1); Feb. 20, 2007. 1 page.

Abstract of Swedish Patent No. SE525048(C2); Nov. 16, 2004, 1 page.

Abstract of Ukrainian Patent No. UA70089(A); Apr. 15, 2001. 1 page.

Ciclitira Paul J etal., "Transition of care between paediatric and adult gastroenterology. Coeliac disease" Apr. 2003, vol. 17, Nr: 2, pp. 181-195. XP002601116.

McGowan B A et al., "Comparison of methods to analyze time-intensity curves in a corn zein chewing gum study", Food Quality and Preference, vol. 17, Issues 3-4, Apr.-Jun. 2006, pp. 296-306. XP025080035. http://www.sciencedirect.com/science/article/pii/S0950329305001102.

Chanvrier H. et al., "Mechanical behaviour of cornflour and starch—zein based materials in the glassy state: A matrix-particle interpretation", Carbohydrate Polymers, vol. 65, issue 3, Aug. 15, 2006, pp. 346-356. XP025087624. http://dx.doi.org/10.1016/j.carbpol.2006.01.027.

Kulp, K. et al., "Preparation of bread without gluten", Bakers digest Bakers Dig, Jun. 1974, vol:48, Nr:3, pp.34-37,58. XP001117974.

Alamprese, C., et al., "Development of gluten-free fresh egg pasta analogues containing buckwheat", European Food Research and Technology, 225(2), Jun. 25, 2007, pp. 205-213.

Lange, E., et al. "Oat products in gluten free diet", Roczniki Panstwowego Zakladu Higieny, 58(1), pp. 103-109.

Broz, R., et al., "Gluten-free product development", Cereal Foods World, 52(3),Apr. 6, 2007, pp. 148-149.

Jackson, V., et al., "Utilization fo Rice Starch in the Formulation of Low-Fat, Wheat-Free Chicken Nuggets", Journal of Applied Poultry Research, 15(3), Mar. 19, 2007, pp. 417-424.

Neumann, H., et al., "What do coeliac sufferers need? Answer: gluten free bread and bakery products", Brat & Backwaren 45(5), Sep. 1, 1997, pp. 6, 23-25, 36-39, 41.

Toufeili, I., et al., "Formulation of gluten-free pocket-type flat breads: optimization of rnethylcellulose, gum Arabic, and egg albumen levels by response surface methodology", Cereal Chemistry, 71(6); May 1,1995, pp. 594-601.

Moore, M., et al., "Textural comparisons of gluten-free and wheat-based doughs, batters, and breads", Cereal Chemistry 81(5), Oct. 18, 2004, pp. 567-575.

Schober, T,. et al,, "Influence of gluten-free flour mixes and fat powders on the quality of gluten-free biscuits", European Food Research and Technology, 216(5), Sep. 1, 2003, pp. 369-376.

Gallagher, E., et al., "Improving the quality of gluten-free breads", Farm & Food 12(1), Jul. 29, 2002, pp. 8-13.

Neumann, H., et al., "Investigations with the production of gluten free bread and roll specialties", Getreide, Mehl und Brot 51 (1 ), Nov. 18, 1997, pp. 50-55. (With English Abstract).

Roemisch, U., et al., "Enrichment with different dietary fibres in gluten free baked products using a special experimental design", Getreide, Mehl und Brot 54(1), May 8, 2000, pp. 23-28.

Lazaridou, A., et al., "Effects of hydrocolloids on dough rheology and bread quality parameters in gluten-free formulations", Journal of Food Engineering 79(3), Nov. 6, 2006. pp. 1033-1047.

Sanchez, H., et al., "Optimization of giuten-free bread prepared from cornstarch, rice flour, and cassava starch", Journal of Food Science 67(1), Apr. 15, 2002, pp. 416-419.

Bartnik, M,, et al., "Use of various raw materials in the manufacture of gluten-free bread", Przeglad Piekarski i Cukierniczy 34(3), Sep. 1, 1987, pp. 6-9.

Pordab, Z., etal., "New gluten-free bread", Przemysl Spozywczy 53(1), Sep. 13, 1999, pp. 10-12.

National Starch Food, "Resistant Starch—Rediscover an Old ingredient With Modern Health Benefits", www.resistantstarch.com/NR/rdonlyres/8F450BD-B121-47C7-887C-OB608583C971/0/rshcpfactsheet1 11 506.pdf.

Gallagher, E., et aL, "Recent advances in the formulation of gluten-free cereal-based products" Trends in Food Science & Technology, 15, 2007, pp. 143-152.

Gallagher, E., et al., "Crust and crumb characteristics of gluten free breads", Journal of Food Engineering, 56, 2003, pp. 153-161.

Clerici, MT., et al., "Extruded rice flour as a gluten substitute in the production of rice bread", Sep. 2006 ; 56(3):288-94. http://www.ncbi.nlm.nih.gov/pubmed/17249491.

KOPLAN5KI J., et al., "Thermal transitions of gluten-free doughs as affected by water, egg white and hydroxypropylmethvicellulose", Thermochimica Acta, 2004, vol: 411, pp. 81-89.

Guarda, A. et al "Different hydrocolloids as bread improvers and antistaling agents", Food Hydrocolooids, 18, 2004, pp. 241-247.

Thompson T., "Wheat Starch, Gliadin, and the Gluten-free Diet", Journal of the American Dietetic Association, 101(12), Dec. 2001, pp. 1456-1459.

Sivaramakrishnan, H., et al.. "Rheological properties of rice dough for making rice bread", Journal of Food Engineering, 62, 2004, pp. 37-45.

Haque, A., et al., "Combined use of ispaghula and HPMC to replace or augment gluten in breadmaking", Food Research International, 27, 1994, pp. 379-393.

Shelke et al, "The Dynamics of Cake Baking as Studied by a Combination of Viscometry and Electrical Resistance Oven Heating" Jan. 1, 1990, Cereal Chemistry, American Association of Cereal Chemists, pp. 575-580.

ACS E et al., "Bread From Corn Starch for Dietetic Purposes. I. Structure Formation", Cereal Research Communications, 19960101 Szegel, Hu—ISSN 0133-3720, vol. 24, Nr:4, pp. 441-449, XP008020161.

Ylimaki G et al, "Application of Response Surface Methodology to the Development of Rice Flour Yeast Breads: Objective Measurements", Journal of Food Science, vol. 53, Issue 6, pp. 1800-1805, Nov. 1988. XP002061425.

Miller R A et al., "The Role of White Layer Cakes", Cereal Chemistry, American Association of Cereal Chemists, Minneapolis, vol. 70, pp. 585-588. XP000404160.

EGG-FILLED FOOD PRODUCT

This application is a continuation of U.S. application Ser. No. 11/004,007 filed on Dec. 3, 2004, now abandoned.

BACKGROUND

Consumers of "quick service" foods or "easy to prepare" foods typically prefer foods with an appealing taste that are easily consumed without the use of utensils. As such, a number of egg-filled products are sold as egg sandwiches that include, as components, a cooked egg layer filling sandwiched between two bread or cooked batter layers (e.g., muffins, bread, or other suitable cooked batter layers). Often, these types of egg sandwiches may include other components such as melted cheese, sauce, or other suitable components.

These types of egg sandwiches may be messy and/or difficult to consume for a number of reasons. First, in these type of egg sandwiches, the components often are not integrated and as such, the egg sandwich may fall apart before and/or during consumption. Further, because the filling layer is not encased within the cooked batter layers, any liquid material present in the cooked egg layer (e.g., juice from the egg material and/or melted cheese) may drip from the sandwich during reheating and/or consumption. As such, it is desirable to create an egg-filled product that does not fall apart before and/or during consumption. It is also desirable to create an egg-filled product from which liquid material is not likely to drip during reheating and/or consumption.

To create an egg-filled product that addresses these problems, cooked egg material may be formed with a dough material that is subsequently cooked. However, in such an egg-filled product, the cooked egg material may easily become overcooked as the coating batter is cooked. Egg material that is overcooked is commonly not very palatable because overcooking the egg material may destroy the flavor and/or texture of the egg material. As such, it is also desirable to provide palatable, egg-filled food products.

SUMMARY

The disclosed food product generally relates to filled food products that include a cooked batter. In particular, the disclosed food product relates to egg-filled food products in which the filling includes cooked egg material and the batter is a non-yeast leavened batter. Also disclosed are methods directed to the preparation of filled food products.

Also disclosed is a food product that includes a (A) a cooked egg filling component; and (B) a cooked batter coating component formed from a non-yeast leavened batter. The filling is coated on at least one side with the batter. In one suitable embodiment, the cooked egg filling component is coated on all sides with the cooked batter coating component.

The cooked egg filling may include egg white material, egg yolk material, whole egg material, and mixtures thereof. In one suitable embodiment, the egg filling includes egg white material. In another suitable embodiment, the egg filling includes egg white material and egg yolk material.

The egg filling may include a simulated egg patty. For example, the egg patty may be produced by (1) optionally freezing egg yolk material; (2) combining the frozen egg yolk material and liquid egg white material to form a combined egg material; and (3) cooking the combined egg material to produce the simulated egg patty.

The food product may include additional components in egg and/or as a second filling. For example, the food product may include one or more vegetables including onion, pepper (e.g., chile pepper), tomato, potato, broccoli, carrot, corn, garlic, spinach, beans, mushrooms, squash, celery, sweet potato, yam, olive, artichoke, peas, ginger, water chestnut, and mixtures thereof. The vegetable may be in the form of vegetable pieces. The food product may also include fruit including apple, pear, peach, blueberry, raspberry, strawberry, pineapple, orange, raisin, apricot, cherry, banana, or mixtures thereof. The fruit may be in the form of fruit pieces.

The food product may also include a meat material, (e.g., as part of the filling or as a separate filling layer). The meat material may be used in any suitable form, such as meat pieces or a meat patty. Exemplary meats include pork, beef, and/or poultry. Suitable meat material may include bacon strips or pieces, ham slices or pieces, and/or a sausage patty or pieces. The meat material is commonly pre-cooked before inclusion in the filling.

The food product may also include a cheese material (e.g., as part of the filling or as a separate filling layer). In one suitable embodiment, the cheese material is melted by heating the product prior to consumption. Suitable cheese material may include cheddar cheese, American cheese, Swiss cheese, cream cheese, Jack cheese, pepper Jack cheese, parmesan cheese, Romano cheese, asiago cheese, provolone cheese, mozzarella cheese, asadero cheese, manchego cheese, and mixtures thereof. In some embodiments, the cheese material may be in the form of pieces and/or a slice.

The food product may also include a syrup filling material. The syrup filling material may be naturally and/or artificially sweetened. In addition, the syrup filling material may be naturally and/or artificially flavored. In one embodiment, the syrup filling material includes corn syrup and maple syrup flavoring.

The batter typically includes as components, water and/or milk, wheat flour, liquid egg material, and a non-yeast leavening agent. In some embodiments, the batter may include dried milk solids (e.g., dried non-fat milk solids). The batter may be prepared by mixing these components.

The non-yeast leavening agent may be selected from any suitable agent that produces gas (e.g., $CO_2$) when the batter is mixed or cooked, or that imparts a light texture to the cooked batter. Non-yeast leavening agents may include salts, acids, and mixtures thereof. Suitable leavening agents may include sodium bicarbonate, ammonium carbonate, ammonium bicarbonate, potassium tartrate, sodium pyrophosphate, sodium aluminum phosphate, monocalcium phosphate monohydrate, anhydrous monocalcium phosphate, anhydrous dicalcium phosphate, dicalcium phosphate dihydrate, monoaluminum phosphate, dialuminum phosphate, monoammonium phosphate, diammonium phosphate, sodium aluminum sulfate, tartaric acid, fumaric acid, adipic acid, acetic acid, glucono delta lactone (GDL), and mixtures thereof. Non-yeast leavening agents such as baking powders (e.g., mixtures of sodium bicarbonate and an acid component such as tartaric acid) are often employed. A commonly used mixture of non-yeast leavening agents may include sodium bicarbonate, tartaric acid, and optionally monocalcium phosphate monohydrate and/or sodium aluminum sulfate.

The food product may be capable of storage without spoiling at any suitable temperature. For example, the food product may be refrigerated at approximately 4° C. (~40° F.) and/or frozen at approximately −20° C. (~4° F.). Prior to consumption, the food product may be reheated by any suitable heating method (e.g., conventional oven, microwave oven, toaster oven, griddle, and the like).

The egg-filled food product may be prepared by (1) coating a frozen, cooked or uncooked egg filling with a non-yeast leavened batter and (2) supplying sufficient heat to the coated frozen egg filling to at least partially cook the batter and/or the egg filling.

BRIEF DESCRIPTION OF THE DRAWINGS

In FIG. 1, a first batter portion is placed on a cooking surface. Optionally, the first batter portion may be at least partially cooked. A cooked or uncooked frozen egg filling is then placed on top of the first batter portion. Optionally, a second batter portion is added to surround the egg filling and the combined batter portion are further cooked.

In FIG. 2, a frozen egg filling is placed on a cooking surface. Subsequently, batter is added and at least partially cooked. In (a), the frozen egg filling remains in contact with the cooking surface after the batter is added. In (b), the frozen egg filling is lifted off the cooking surface after the batter is added.

In FIG. 3, a first batter portion is placed on a first cooking surface. Optionally, the first batter portion may be at least partially cooked. A cooked or uncooked frozen egg filling is then placed on top of the batter portion. A second batter portion is placed on a second cooking surface and at least partially cooked. The second batter portion is then placed on top of the first batter portion with the cooked surface of the second batter portion placed face up on top of the first batter portion. The combined portions then may be further cooked.

DETAILED DESCRIPTION

Figure 1:
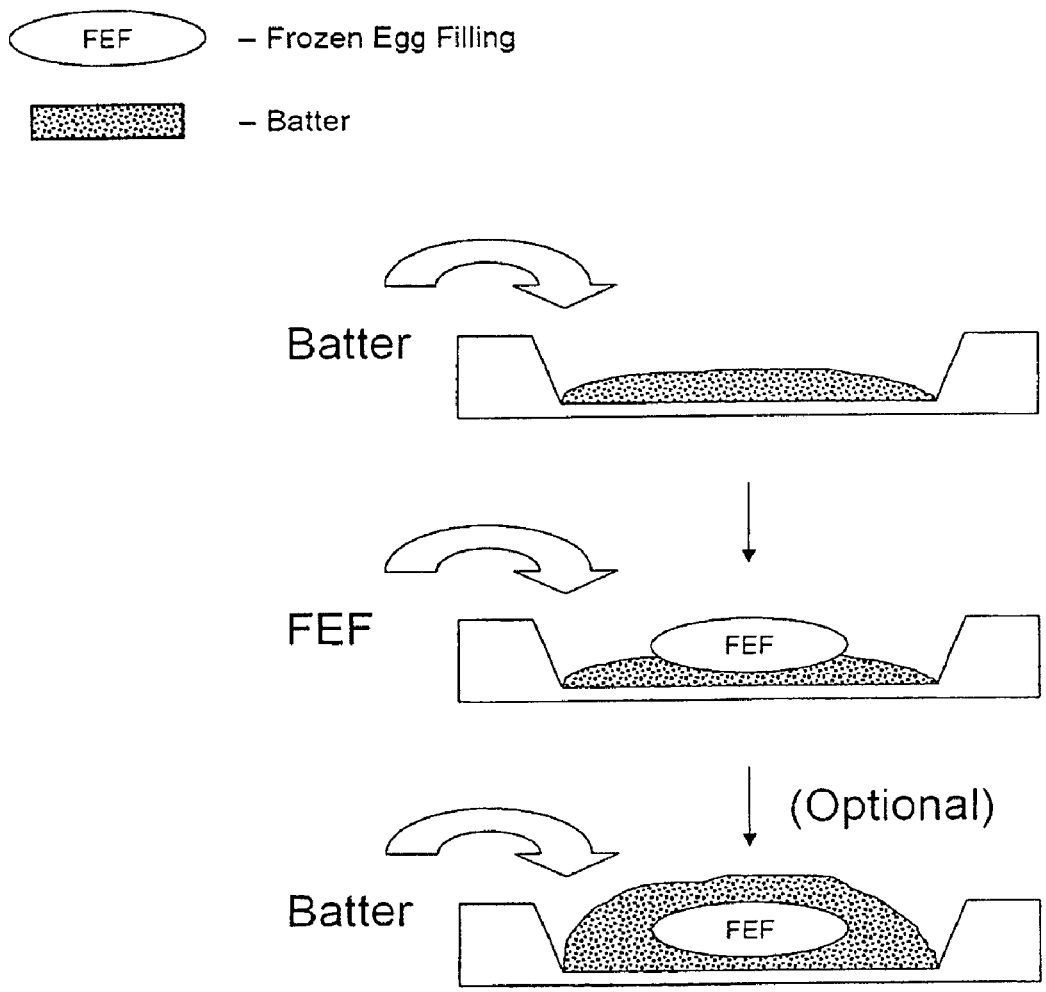
FIGS. 1-3 are graphic representations of exemplary methods for preparing filled food products.

Disclosed is a filled food product that includes egg material as a filling. The food product may be prepared by freezing the egg material and depositing the frozen egg material on batter material. Optionally, the batter material may be at least partially cooked prior to depositing the frozen egg material. The egg material may be pre-cooked or uncooked. By freezing the egg material prior to depositing the egg material on the batter material, the egg material does not become overcooked and remains palatable, retaining its egg flavor and texture. The food product may include, as examples, an open-faced egg sandwich, an egg-filled pancake, and an egg-filled waffle, (e.g., egg filling material completely encased within gelatinized batter). As used herein, "gelatinized" may mean "at least partially cooked" and/or "at least partially set."

The egg-filled food product includes at least partially cooked batter. Batter is suitable in contrast to dough because batter typically has a high water content in contrast to dough. Further, batter typically has a moderate to low viscosity in contrast to dough, such that the batter easily spreads when applied to a cooking surface of a cooking container.

The egg-filled food product products described herein include components that are at least partially cooked. For example, the food product may include cooked or egg filling material at least partially coated with cooked batter material. Optionally, the egg filling and/or batter may be at least partially cooked. In one suitable embodiment, the food product may include a fully cooked egg filling material at least partially coated with a fully cooked batter material. The term "fully cooked" means that substantially all of the batter in the food product has been gelatinized and/or substantially all of the egg material is no longer liquid. As the batter becomes gelatinized, it becomes less liquid and flowable and becomes more dry and spongy. The product may attain a golden brown color on the portion exposed to the cooking surface of a cooking container and/or on the surface of the entire food product.

The food product may be any number of batter-derived products including open-face sandwiches, pancakes, waffles, muffins, and cakes as examples. In particular, the food product may be an egg-filled pancake. In one suitable embodiment, the food product is an open face egg sandwich. In another suitable embodiment, the food product is an egg-filled pancake that includes an egg-filling material coated on all sides with a cooked batter material. As such, the pancake forms a casing that completely surrounds the egg filling material with gelatinized batter to form an integrated food product.

In one suitable embodiment, the method includes: (A) placing a first portion of the batter in a cooking container; (B) placing a frozen, cooked or uncooked egg filling on the first batter portion; and (C) at least partially cooking the first batter portion. In one embodiment, the first batter portion is fully cooked. Optionally, the method may include: (D) placing a second portion of the batter on the egg filling; and (E) fully cooking the first and second batter portions. In some embodiments, the first portion is partially cooked to support the frozen egg filling and to help prevent the egg filling from falling through the batter to the bottom of the cooking container. In another suitable embodiment, the frozen filling is coated on all sides with the batter prior to cooking.

Process of Preparing an Egg-Filled Food Product

Generally, the food products described herein are prepared by combining a filling material and batter material. For example, the food product may be prepared by depositing a filling on a first batter portion (e.g., as shown in FIG. 1). Optionally, the batter portion may be at least partially cooked prior to depositing the filling on the batter portion. After the filling has been deposited on the batter portion, the batter portion may be cooked (either partially or fully). Optionally, the filling and at least partially cooked batter portion may be combined with another portion of batter, which may have been at least partially cooked. In one suitable embodiment, the combined batter portions then are further heated to produce a fully cooked food product with the filling encased within the combined cooked batter portions.

Figure 2:
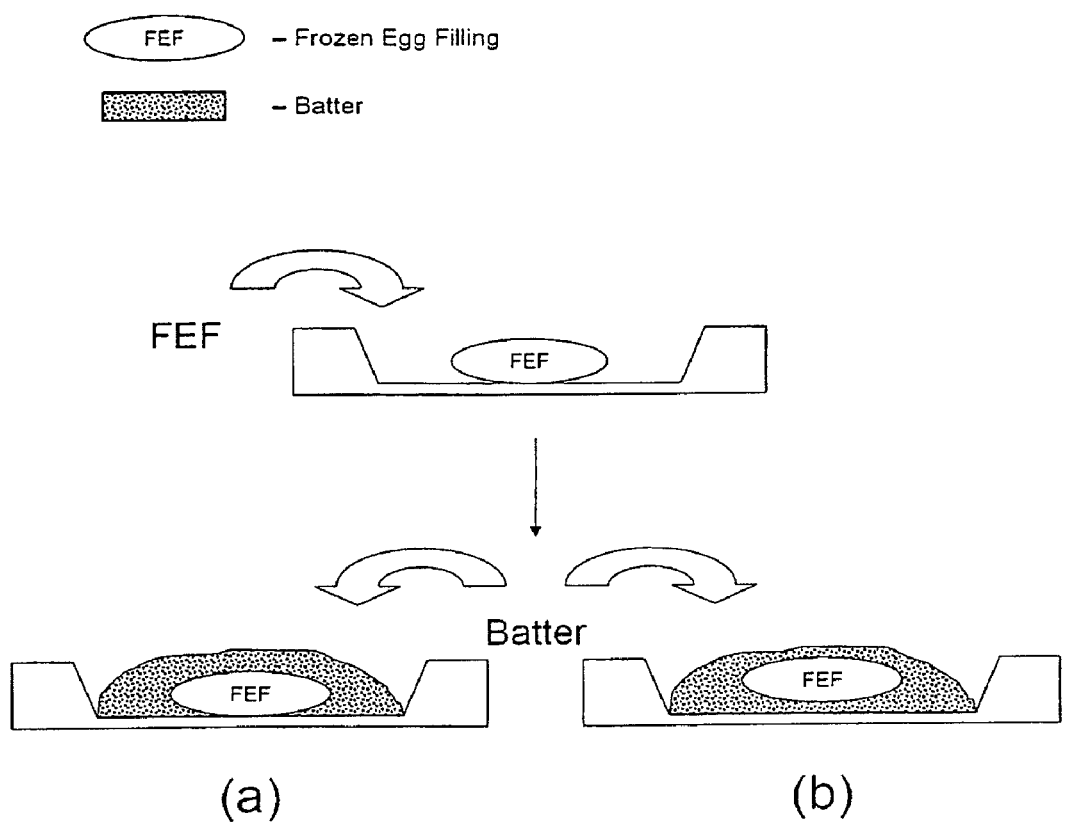

Alternatively, the filling may be deposited in a cooking container and then batter may be added to the cooking container to cover the filling (e.g., as shown in FIG. 2). The filling may remain in contact with the cooking surface, of the batter may lift the filling from the cooking surface as the batter is added to the filling. The batter is then cooked to at least partially encase the filling. After the batter components have been cooked, it may be desirable to flash freeze the egg-filled food product for storage purposes.

The food product commonly may be refrigerated or frozen until it is ready to be consumed. Prior to being consumed, the food product may be reheated.

The batter may be cooked by applying any suitable type of heat. For example, the batter may be cooked by conduction, convection, radiation, and the like.

The food product may be prepared on any suitable cooking surface. For example, the food product may be prepared in cooking containers, cooking belts, and the like.

Figure 3:
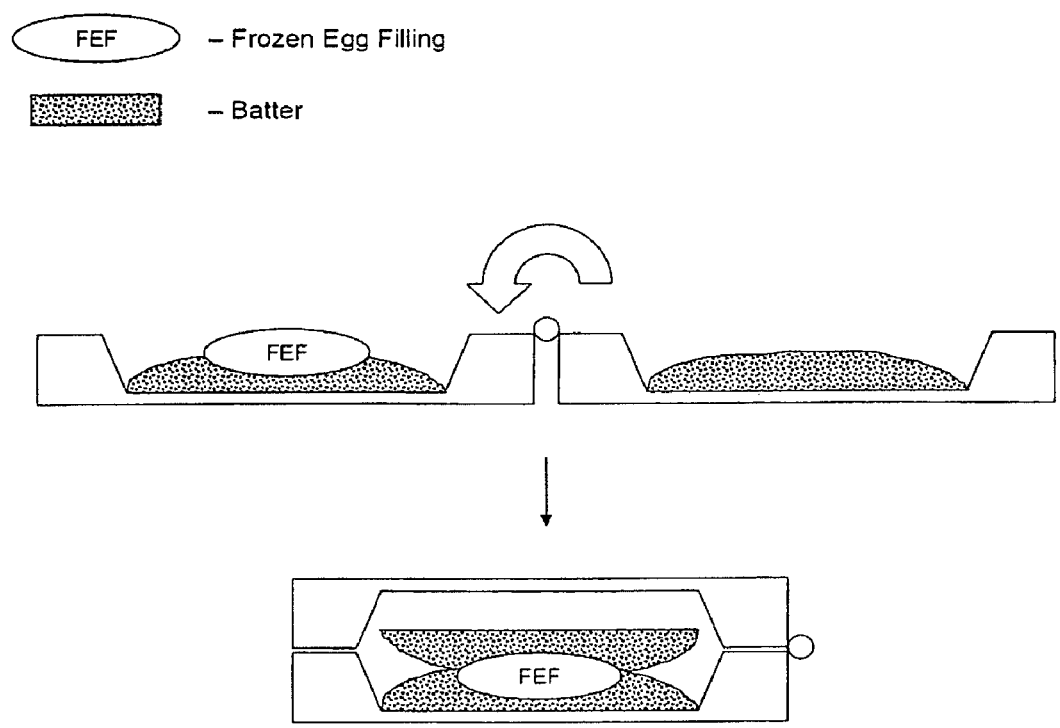

In one suitable embodiment, the food product may be prepared by aliquoting a first portion of batter into a first cooking container and a second portion of batter into a second cooking container (e.g., as shown in FIG. 3). The first and second portions may be heated to at least partially cook and/or gelatinize the batter. A frozen egg filling material may be deposited on the first portion and/or second portion. Then, the first and second portions may be combined to surround the frozen egg filling material with partially ungelatinized batter. The combined portions may then be further heated to cook and/or gelatinize the batter. The amount and duration of heat applied is desirably sufficient to cook and/or gelatinize the batter without any substantial further cooking of the egg filling, for example, such that the frozen egg filling may be warmed to about room temperature during the cooking process.

The first batter portion may be placed on to the cooking surface using any suitable implement (e.g., cups, spoons, funnels, and the like). Automated methods may be used to ensure that approximately the same amount of batter is deposited each time the food product is prepared.

The cooking surface may be flat (e.g., a pan, griddle, belt or the like). In another embodiment, the cooking surface may have indentions (e.g., squares, triangles, letters, or other suitable shapes). Suitable cooking containers include waffle irons or waffle griddles.

The cooking surface may be manufactured from any suitable material including metals (e.g., cast iron, aluminum and the like), and non-stick materials such as teflon. In addition, the cooking surface may be additionally treated (e.g., sprayed) with a non-stick substance that prevents or inhibits the food product from sticking to the cooking surface. Suitable non-stick substances may include fats (e.g., butters, oils, and the like) and/or non-stick sprays (e.g., pan-release agents such as silicone). The non-stick substance may be applied to the cooking surface of the cooking container before, after, or at the same time as the batter is placed in the cooking container.

The batter portion may placed on to an unheated cooking surface. Alternatively, the cooking surface may be preheated to a suitable temperature prior to placing the batter on to the surface. Generally, the cooking surface may be preheated to a temperature of about 160° C. (~325° F.) to about 260° C. (~500° F.). More suitably, the cooking surface may be preheated to a temperature of about 175° C. (~350° F.) to about 230° C. (~450° F.).

Generally, the food product may be prepared by dividing the batter into at least two aliquots. The first aliquot may be deposited into a preheated cooking surface (e.g., a cooking container preheated to about 205° C. (~400° F.)). The first aliquot may then be cooked for about 30 seconds to about 120 seconds (more suitably about 60 seconds to about 90 seconds) to at least partially cook the first aliquot. The frozen egg filling material then may be placed on top of the at least partially cooked first aliquot of batter.

In one embodiment, the second aliquot of batter may be placed on top of the at least partially cooked first aliquot and frozen egg filling material. The food product then further may be heated to cook the first and second aliquots of batter and further gelatinize the batter.

In another embodiment, the second aliquot of batter may be placed on to a second cooking surface and at least partially cooked (e.g., by heating the cooking surface to about 205° C. (~400° F.) for about 60 to about 90 seconds). The at least partially cooked second aliquot of batter then may be placed on top of the at least partially cooked first aliquot of batter and frozen egg filling material with the cooked surface of the second aliquot of batter facing upwards. Alternatively, the at least partially cooked first aliquot of batter and frozen egg filling material may be placed on top of the at least partially cooked second aliquot of batter with the cooked surface of the first aliquot of batter facing upwards.

The batter may be at least partially cooked to prevent the filling from sinking through the batter to the cooking surface and protruding through the batter. The batter may be cooked until the top surface temperature of the edges of the batter is about 50° C. (~120° F.) to about 70° C. (~155° F.), (more suitably about 55° C. (~130° F.) to about 65° C. (~145° F.)). The bottom surface of the batter may be cooked until it becomes somewhat spongy and attains a golden brown color. Suitable cooking times may vary based on a number of factors including the composition of the batter and the size of the food product.

In one embodiment, the egg filling material and/or other filling material generally is deposited on the ungelatinized top surface of an at least partially cooked first batter portion. In some embodiments, the egg filling material and/or other type of filling may be deposited on the ungelatinized top surface of an at least partially cooked first batter portion and an at least partially cooked second batter portion. The egg filling material and/or other filling material may be deposited in any suitable manner. Suitable implements for depositing the filling include a tong, cup, spoon, funnel, syringe, or the like. Typically, each food product receives the same amount of filling material.

The filling material may be deposited on the at least partially cooked batter, and generally, the batter is not fully cooked prior to depositing the filling material. Rather, the top surface of the batter may be ungelatinized and sticky to permit joining of the batter with a second batter portion. As such, the filling may be sealed and/or encased in the at least partially cooked batter to prevent the filling or juices from the filling from leaking from the food product.

After the batter portions have been combined and include the deposited filling, the combined portions may be further heated in order to bond the portions and further gelatinize any uncooked batter. In one embodiment, the combined portions are heated until substantially all the batter is gelatinized. For example, the combined portions may be heated on one side, flipped over and then heated further on the other side. The combined portions may be heated on the same cooking surface as the first and second portions. Alternatively, the combined portions may be heated using other methods including baking in a convention over, heating in a toaster, microwave heating, and the like.

After the portions are combined, the combined portions may be heated for about 30 seconds to about 90 seconds (more suitably about 45 seconds to about 75 seconds) on a cooking surface at about 205° C. (~400° F.). Typically, the food product will be seamless and resemble a single, continuous, filled food structure.

In another embodiment, the frozen filling is placed in preheated cooking container. The cooking surface of the container may be heated to about 205° C. (~400° F.). Batter is then placed in the container to at least partially encase the filling. The batter is heated until it has been gelatinized. The product may then be consumed or stored for consumption at a later time.

The food product typically has a mass/weight of about 10 g (~0.35 oz) to about 80 g (~2.8 oz). More typically, the food product has a mass/weight of about 20 g (~0.7 oz) to about 60 g ~(2.1 oz).

The filled food product may be formed into any suitable shape. For example, the food product may be formed into a circular shape, (including an oval shape), square shape, triangular shape, or the like. Typically, the diameter of a circular shaped food product or the diagonal of a square shaped food product may range from about 5 cm (~2 in.) to about 25 cm (~10 in.). More suitably, the diameter of a circular shaped food product or the diagonal of a square shaped food product will range from about 10 cm (~4 in.) to about 20 cm (~8 in.). The size of the food product may be adjusted according to the size of the filling material.

Generally, the food product is about 12 mm (~0.5 in) to about 100 mm (~4 in) in thickness at about the center of the product. In other embodiments, the food product is about 24 mm (~1.0 in) to about 50 mm (~2 in) in thickness at the center of the food product.

The size of the food product may be significant in determining the proper cooking time/temperature. For example, the surface-to-volume ratio is dependent on the surface area of the product and the thickness of the product.

After the food product is removed from the cooking surface, generally, the food product is suitable for consumption. However, the food product also may be stored prior to consumption. Suitable storage methods include refrigeration (e.g., at about 4° C. (~40° F.)) and/or freezing (e.g., at about −20° C. (~−4° F.)). The refrigerated or frozen food product may be reheated prior to consumption. Suitable methods for reheating include baking in a conventional oven, heating on the surface of a griddle and/or cooking container, heating in a toaster oven, microwave heating, and the like.

The food product also may be packaged before storage if desirable. For example, the refrigerated and/or frozen food product may be packaged for distribution to the consumer or for distribution to restaurants (e.g., "quick service" restaurants).

Batter

The batter used to make the food product described herein is generally a mixture of liquid ingredients and dry ingredients that have been combined together to produce a batter with a desired viscosity. Liquid ingredients may include water, dairy products (e.g., milk, cream, buttermilk and the like), oil, eggs, liquid sweeteners (e.g., corn syrup), and/or liquid flavorings. Dry ingredients may include flour, non-yeast leavening agents, sweeteners (e.g., natural sweeteners and/or artificial sweeteners), dried egg products, dried dairy products, salt, and/or flavorings (e.g., pepper, herbs, and the like). If suitable, the ingredient may be added in liquid and/or dry form. For example, milk and/or eggs may be added in a liquid form or substituted with a dried milk product or dried egg product, respectively.

Examples of batters include pancake batter, waffle batter, corn bread or corn griddle cake batter, quick bread and muffin batters (e.g., scones, muffins, biscuits, and the like), potato cake batter, and crepe batter.

Generally, the batter includes water, flour, egg material (liquid and/or dry), and a non-yeast leavening agent. Suitable types of flours may include glutinous flours, non-glutinous flours and mixtures thereof. If a non-glutinous flour is selected, then a glutinous flour, gluten, and/or gluten-by-products also may be included in the batter. Suitable flours include wheat, corn, rye, barley, oats, sorghum, rice, and the like. The batter may include a processed flour and/or whole grain flours. For example, the batter may include debranned and/or degermed flours.

The batter may also include starchy vegetable flours. For example, potato flour may be suitable for preparing the batter.

Typically, the batter includes about 20% to about 40% flour by weight. More typically, the batter includes about 25% to about 35% flour by weight.

The batter also includes liquid ingredients. The relative amount of liquid ingredients (e.g., water, milk, liquid eggs, oil and the like) and dry ingredients (e.g., flour, dry eggs, dry milk and the like) may be adjusted to control the viscosity of the batter. In general, the viscosity of the batter will increase with a higher relative amount of dry ingredients versus liquid ingredients. Typically, the batter includes about 35% to 75% total liquid ingredients by weigh. More typically, the batter includes about 45% to about 65% total liquid ingredients by weight. Generally, the batter is a combination of dry ingredients and liquid ingredients with a high water or liquid content. The high liquid content provides a low viscosity and a pourable or flowable consistency.

The batter may also include egg material. For example, the batter may include whole eggs, egg white material, egg yolk material, egg substitutes, dried egg products, and/or frozen egg products. The egg material may be in a liquid and/or dried form. Typically, the batter will include about 5% to about 20% egg material by weight. More typically, the batter will include about 10% to about 15% egg material by weight.

Optionally, the batter and/or filling may include dairy products. For example, the batter may include milk (e.g., nonfat, 2% milk, and/or whole milk), buttermilk, cream, whey, milk protein (e.g., casein), butter, cheese and other dairy products. The batter and/or filling may also include dairy substitutes such as soy milk and/or rice milk. In some suitable embodiments, the batter may include about 5% to about 75% dairy products by weight. More typically, the batter may include about 10% to about 40% dairy products by weight. The batter may include dairy products in liquid and/or dry form. Liquid dairy products may be used to modulate the viscosity of the batter.

The batter also typically includes a non-yeast leavening agent. "Leavening agent" as used herein, may be defined as "any substance used to produce or stimulate production of carbon dioxide in baked goods and/or to impart a light texture." Generally, the non-yeast leavening agent generates gas in the batter (e.g., $CO_2$) either before or during cooking. For example, the leavening agent may include a carbonate salt and/or a bi-carbonate salt. Suitable carbonate and bicarbonate salts may include sodium carbonate, potassium carbonate, sodium bicarbonate, potassium bicarbonate, ammonium bicarbonate and mixtures thereof. The non-yeast leavening agent may also include a variety of leavening acids or non-carbonate salts. For example, the non-yeast leavening agent may include citric acid, sodium acid pyrophosphate (SAPP), sodium aluminum phosphate (SALP), monocalcium phosphate (MCP), dicalcium phosphate (DCP), sodium aluminum sulfate (SAS), anhydrous monocalcium phosphate (AMCP), dimagnesium phosphate (DMP), dicalcium phosphate dihydrate (DCPD), glucono delta lactone (GDL) and mixtures thereof. Generally, the batter includes about 0.2% to about 2.5% non-yeast leavening agents. More typically, the batter includes about 1.0% to about 2.0% non-yeast leavening agents.

Filling

The food product includes a filling that represents about 25% to about 75% of the food product by weight. More typically, the filling represents about 45% to about 65% of the food product by weight. The filling has a mass/weight of at least about 3.5 g (~0.125 oz). More typically, the filling has a mass/weight of about 7 g (0.25 oz) to about 56 g (2 oz.)

The filling typically includes cooked egg material. Typically, the filling comprises at least 10% egg material by weight. More typically, the filling comprises at least about 30%, 50%, 70% or 90% egg material by weight.

The egg material may include liquid egg products, (such as liquid whole eggs, liquid egg whites, liquid egg yolks, and mixtures thereof), concentrated liquid egg products, and mixtures thereof.

The filling may include additional ingredients such as salts and/or buffers (e.g., sodium chloride, SAPP, MSP, and/or MSG), water, thickening agents (e.g., xanthan gum, carrageenan), milk products (e.g., butter milk and/or nonfat milk), edible oils (e.g., soybean oil), flavors (e.g., butter, pepper, and/or egg flavors), acidifying agents (e.g., citric acid to achieve a pH of about 6.7 to about 6.8), chelating agents (e.g., EDTA), and antimicrobial agents (e.g., nisin).

In one embodiment, all ingredients are combined and blended until to form a homogenous mixture. Portions of the mixture are deposited into a container or on to a cooking surface, which may include pans, griddles, and belts. The egg material is then cooked by conduction, convection, radiation, or any combination thereof. Moist and/or dry heat may be applied to the egg material. The egg patty is fully cooked when the egg material has solidified and the internal temperature has reached approximately 70° C. ~(160° F.). The cooked patty is then frozen (e.g., at −20° C. (~−4° F.)) for later use.

The filling may include a simulated egg patty produced by (1) optionally freezing egg yolk material; (2) combining the egg yolk material and liquid egg white material to form a combined egg material; and (3) cooking the combined egg material to produce a simulated egg patty.

The filling may be produced by heating liquid egg material to a temperature of about 75° C. (~170° F.) to about 90° C. (~195° F.). To prepare a filling that includes scrambled egg, the heated egg material may be passed through a holding tube that includes an aperture where the heated egg material exits the holding tube to produce scrambled egg (i.e., by extrusion). To prepare a filling that includes a cooked egg patty, the egg material may be heated in a cooking container that has a suitable shape for the egg patty. To prepare a filling that includes a folded egg patty, the cooked egg patty may be folded (e.g., into thirds).

The filling typically includes cooked egg material. In certain embodiments, the filling may include one or more additional ingredients such as the additional ingredients described below. The additional ingredients may be part of the filling and/or may be in the form of a separate filling layer.

Additional Ingredients

The food product may include additional ingredients. For example, additional ingredients may be present in the batter, filling and/or may be present as an additional filling layer.

In certain embodiments, the food product may include fat material. For example, the batter and/or filling may include fat material. Fat material may include butter, oil, shortening, and the like. Suitable oils may include corn oil, canola oil, soy bean oil, sunflower oil, cottonseed oil, peanut oil, safflower oil, coconut oil, palm oil, olive oil, and other suitable oils. Suitable shortenings may include animal fats and/or fully or partially hydrogenated vegetable oils. In some suitable embodiments, the batter may include about 2% to about 10% fat by weight. The fat and shortening components may be present in solid or semi-solid form.

Furthermore, the food product may include a sweetener and/or artificial sweetener. For example, the batter and/or filling may optionally include a sweetener and/or artificial sweetener. Suitable sweeteners may include dry sweeteners and liquid sweeteners. Suitable sweeteners may include sucrose, fructose, lactose, dextrose, maltose, arabinose, galactose, glucose, xylose, mannose, corresponding sugar alcohols (e.g., mannitol), corn syrup and/or hydrolyzed corn syrup, honey, molasses, malt, maple syrup, saccharin, aspartame, and mixtures thereof. In some suitable embodiments, the batter may include about 0.5% to about 10% sweeteners by weight.

The food product may also include additional flavors. For example, the batter and/or filling also may include additional flavorings. Flavorings may include salts (e.g., sodium chloride, potassium chloride, sodium monosodium glutamate, calcium chloride and the like), spices (e.g. pepper, cinnamon, nutmeg and the like), herbs (e.g., thyme, oregano, tarragon, and the like), vanilla, whey, malt, yeast extract, and mixtures thereof. In some suitable embodiments, the batter may include about 0.1% to about 5% additional flavorings by weight. Natural and/or artificial flavors may also include egg flavors, butter flavors, cheese flavors, smoke flavors, bacon flavors, and mixture thereof.

The food product may also include particulate ingredients intermixed in the batter and/or filling. For example, the batter and/or filling may include vegetable or fruit pieces, nuts or nut pieces, flavor chips (e.g., chocolate chips) and the like. In some suitable embodiments the batter includes about 0.1% to about 15% particulate ingredients by weight.

The food product may include stabilizing agents and/or emulsifiers. For example, stabilizing agents and/or emulsifiers may be included in the batter and/or filling. Suitable stabilizers and emulsifiers may include lecithin, monoglycerides and diglycerides of fatty acids, sodium stearoyl lactylate, esters of fatty acids, propylene glycol monoester, propylene glycol diester, polysorbate, sorbitan and the like.

The food product may also include agents for modifying the viscosity of the batter and/or filling prior to cooking. For example, the batter and/or filling may include gums and/or starches. Suitable gums may include pectin, guar, locust bean, tara, gellan, alginate, tragacanth, karaya, Ghatti, agar, gelatin, arabic, acacia, carrageenan, xantham, cellulose, carboxymethylcellulose, hydroxypropylmethocellulose, or mixtures thereof. Suitable starches may include natural or modified starches, including food starches such as cornstarch, waxy cornstarch, rice starch, wheat starch, tapioca starch, potato starch, arrowroot starch, maize starch, oat starch, and mixtures thereof.

The food product may also include fortificants (e.g., vitamins). For example, the batter and/or filling may include fortificants. Suitable fortificants may include ascorbic acid, beta carotene, biotin, calcium pantothenate, choline, folic acid, niacin, Vitamin A, Vitamin $B_1$, Vitamin $B_2$, Vitamin $B_6$, Vitamin $B_{12}$, Vitamin $D_2$, niacinamide, Vitamin $D_3$, Vitamin E, Vitamin K, boron, calcium, chromium, copper, iodine, iron, magnesium, molybdenum, nickel, potassium, selenium, vanadium, zinc, calcium citrate, calcium gluconate, calcium lactate, calcium caseinate, calcium chloride, calcium citrate malate, calcium glycerophosphate, calcium hydroxide, calcium malate, calcium stearate, calcium sulfate, and mixtures thereof.

The food product may also include supplemental protein. For example, supplemental protein may be present in the batter and/or filing. Suitable protein sources may include egg albumen, whey protein, soy protein, vital wheat gluten, peanut protein, pea protein, and mixtures thereof.

The food product may also include natural and/or artificial colorants. For example, natural and/or artificial colorants may be present in the batter and/or filling. Colorants may include natural dyes (e.g., dyes extracted from fruits or vegetables) and/or artificial dyes.

The food product may also include preservatives. For example, preservatives may be present in the batter and/or filling. Suitable preservatives include sodium benzoate, potassium sorbate, sodium propionate, calcium propionate, nisin, and mixtures thereof.

The food product may also include agents for modifying pH. For example, the batter and/or filling may include agents for modifying pH. Suitable agents for modifying acidity may include citric acid.

The food product may also include chelating agents. For example, chelating agents such as EDTA may be present in the batter and/or filling.

Batter Formulations

I. Pancake Batter

| INGREDIENTS | PERCENT (w/w) |
| --- | --- |
| Pastry or All Purpose Flour | 25% |
| Sugar | 3% |
| Salt | 0.3% |
| Baking Powder | 1.7% |
| Liquid Whole Egg | 11% |
| Milk | 51% |
| Vegetable Oil | 8% |

All liquid ingredients are combined and mixed. Separately, all dry ingredients are combined and mixed. The appropriate quantities of dry ingredients are generally placed in a vessel such as a bowl and mixed. A number of implements are suitable for mixing the liquid and/or dry ingredients including a ribbon blender, a spoon, a spatula and the like. The dry ingredients are generally mixed until they are substantially evenly dispersed.

The liquid ingredients are then added to the dry ingredients and the two are mixed until combined to form the batter. Lumps should still be visible in the batter. Over-mixing will cause gluten overdevelopment which creates a tough product. Preferably the liquid and dry ingredients are mixed in a ribbon blender between about 5 minutes and about 15 minutes.

Once prepared, the batter may be used immediately or stored for later use. However, batter that has been mixed more than about 2 hours prior to use may not generate a suitable food product.

II. Pancake Batter Preparation

Commercial pancake batter mix (Bisquick® brand pancake mix) was measured into a mixing container. Water was added per the instructions on the packaging. Liquid egg was added such that the liquid pancake batter had a suitable viscosity as determined qualitatively. The liquid pancake batter had a viscosity that was high enough to completely cover a frozen egg patty and/or flow out of an industrial volumetric filler without splashing. The liquid pancake batter had a viscosity that was low enough such that the filler would not create "strings" of batter after depositing the batter.

III. Waffle Batter

| INGREDIENTS | PERCENT (w/w) |
| --- | --- |
| Pastry or All Purpose Flour | 27% |
| Sugar | 3% |
| Salt | 0.3% |
| Baking Powder | 1.7% |
| Liquid Whole Egg | 16% |
| Milk | 39% |
| Vegetable Oil | 13% |

Filling Formulations

I. Scrambled Egg Filling

| INGREDIENTS | PERCENT (w/w) |
| --- | --- |
| Liquid Whole Eggs | 87.5-97.0 |
| Nonfat Milk | 0.5-2.0 |
| Soybean Oil | 0.5-2.0 |
| Modified Cornstarch | 0.1-1.5 |
| Salt | 0.1-1.5 |
| Black Pepper Flavor | 0.5 |
| Liquid Black Pepper | 0.3 |
| Xanthan Gum | 0.1-0.5 |
| Citric Acid | 0.12 |
| Butter Flavor | 0.06 |
| Sub Total | 96-99 |
| Water from Processing | 1-4 |
| TOTAL | 100 | pH 6.6 ± 0.1
Solids: 26-29

The ingredients were combined and agitated to create a liquid egg mixture. Additional citric acid was added to the mixture to adjust the pH to about 6.6±0.1 if necessary.

The liquid egg mixture, at a temperature of about 4° C. (~40° F.), was pumped by use of a positive displacement pump through a water-jacketed tube in tube pre-heater and brought to a temperature of about 60° C. (~140° F.). The preheated liquid whole egg product was then pumped by means of a positive displacement pump into a scraped surface heat exchanger (SSHE). The dasher contained within the barrel was operated at 270 rpm. Hot water was circulated in the jacket of the SSHE barrel and heat was indirectly transferred to product within the barrel. As the liquid egg product exited the SSHE at a temperature of about 75° C. (~170° F.), it immediately entered one branch of the hold tube. After a period of about 5 minutes, a rotating valve opened to a second 100-foot branch of the holding tube and the product was forced into this section of the holding tube. The proteins within the liquid egg product became denatured and coagulation occurred within the holding tube. For a period of about 5 minutes, the heated liquid egg product was left undisturbed. At the exit of the holding tube, the cooked liquid egg product was forced through an extrusion plate.

II. Simulated Egg Patty Filling a. Egg White Mixture

| INGREDIENTS | PERCENT (w/w) |
| --- | --- |
| Liquid Egg Whites | 97-99 |
| Whey Protein Isolate | 0.5-2.0 |
| Powdered Egg Flavoring | 0.5 |
| Liquid Egg Flavoring | 0.2 |
| EDTA | 0.01-0.05 |
| Nisin | 0.02 |
| TOTAL | 100 | pH 8.2

The ingredients were combined and agitated to create a liquid egg white material.

b. Yolk Centers

| INGREDIENTS | PERCENT (w/w) |
| --- | --- |
| Liquid Yolk | 98-99 |
| Water | 0.1-0.5 |
| SAPP | 0.1-0.5 |
| Citric Acid | 0.1666 |

-continued

| INGREDIENTS | PERCENT (w/w) |
|---|---|
| EDTA | 0.01-0.05 |
| Nisin | 0.02 |
| TOTAL | 100 | pH 5.6-5.8

The SAPP, EDTA, Nisin, and water were added to the yolk. Citric acid was added to adjust the pH to about 5.6-5.8. A yolk mold was filled with the yolk material (~16.5 g) and frozen at about −20° C. (~−10° F.) for about three days. The frozen yolk material was then added to the liquid egg white material (~33 g) in an egg patty form and then cooked with steam at about 98° C. (~210° F.) for about 4.5 minutes. Alternatively, the liquid yolk material may be placed on an aliquot of liquid egg white material without first having frozen the yolk material.

III. Egg Patty Filling

| INGREDIENTS | PERCENT (w/w) |
|---|---|
| Liquid Whole Egg | 85% |
| Water | 10% |
| Salt | 0.8% |
| Corn Starch | 1% |
| Xanthan Gum | 0.1% |
| Citric Acid | 0.1% |
| Vegetable Oil | 3% |

The following ingredients were added to pasteurized liquid whole egg: Water, Salt, Corn Starch, and a mixture of Xanthan Gum and oil. Citric Acid was added to adjust the pH to 6.7. The percentage of solids in the egg material mixture was determined to be approximately 23%. After all the ingredients were mixed together, the egg material mixture was allowed to sit at room temperature for about 2 hours to allow any air incorporated into the mixture to escape.

The egg material mixture was then pumped to an industrial filler. The filler weights were adjusted to approximately 0.52 oz. per cup (~15 ml per cup). The cup size was 2⅜" diameter (~6 cm) with 20 cups (impressions)/pan. The pans were then passed through an industrial size convection oven to cook the egg material. The oven settings were as follows: temperature=385° F. (~195° C.) with a range from 380-400° F. (~150-205° C.); steam valve setting=42% steam; total cook time=2 min 45 sec. The product was removed from the pan to a transfer belt and transferred to a liquid nitrogen cryogenic freezer. The product was frozen for approximately 25 minutes at −70° F. (~−65° C.). The product was then packaged and stored at −10° F. (~−20° C.) for later use.

V. Egg-Filled Food Product

1. Food Product Prepared by Depositing Single Portion of Batter on Filling

The food product was prepared by using: (a) the pancake batter prepared from Bisquick® brand pancake mix as described above; and (b) the cooked egg patty filling as described above. Cooking pans with 3.75" (~9 cm) diameter cups were used to cook the product. The cooking pans were sprayed with light oil to facilitate release of the product after cooking. An industrial convection/combi oven was used to cook the product. The oven settings were as follows: temperature setting=425° F. (~220° C.); steam valve setting=20%. The cooking pans first were passed through the oven without any product in the pans to "season" the pans.

The frozen egg patties then were placed in the cups of the pan and the liquid pancake batter then was deposited over the top of the frozen egg patties. The cooking pan was passed through the oven to cook the product (dwell time=3 min 45 sec). After the product was cooked, the product was removed from the pan (i.e., de-panned) and frozen in a liquid nitrogen cryogenic freezer for ~25 min at −70° F. (~−65° C.). The product then was packaged for storage.

2. Open-Faced Food Product

A portion of liquid pancake batter was placed in the cups of the pan. The frozen egg patties then were placed on top of the batter. The cooking pan was passed through the oven to cook the product (dwell time=3 min 45 sec). After the product was cooked, the product was removed from the pan (i.e., de-panned) and frozen in a liquid nitrogen cryogenic freezer for ~25 min at −70° F. (~−65° C.). The product then was packaged for storage.

3. Food Product Prepared by Depositing Batter, Filling, and Additional Batter

A portion of liquid pancake batter was placed in the cups of the pan. The frozen egg patties then were placed on top of the batter and a second portion of liquid pancake batter then was deposited over the top of the frozen egg patties. The cooking pan was passed through the oven to cook the product (dwell time=3 min 45 sec). After the product was cooked, the product was removed from the pan (i.e., de-panned) and frozen in a liquid nitrogen cryogenic freezer for ~25 min at −70° F. (~−65° C.). The product then was packaged for storage.

4. Food Product Prepared Using Frozen Uncooked Liquid Egg Filling

In one embodiment, all ingredients are combined and blended to form a homogenous mixture. Portions of the mixture are deposited into forms and then frozen (e.g., at −20° C.~(−4° F.)) for later use.

A portion of liquid pancake batter was placed in the cups of the pan. The frozen uncooked egg patties then were placed on top of the batter and a second portion of liquid pancake batter then was deposited over the top of the frozen uncooked egg patties. The cooking pan was passed through the oven to cook the entire product, both batter and filling (dwell time=3 min 45 sec). After the product was cooked, the product was removed from the pan (i.e., de-panned) and frozen in a liquid nitrogen cryogenic freezer for ~25 min at −70° F. (~−65° C.). The product then was packaged for storage.

Illustrated Embodiments

In one embodiment, the method for preparing an egg-filled food product includes preparing an egg-filled food product by coating a frozen egg filling on at least one side with a non-yeast leavened batter; and cooking the batter. The frozen egg filling may be pre-cooked or uncooked prior to being coated with the batter. In a suitable embodiment, the filling is coated on all sides with batter. In another embodiment, the filling is coated on one-side with the batter.

In another embodiment, the method for preparing an egg-filled food product includes placing a non-yeast leavened batter in a container. A frozen egg filling is then placed on the batter. Optionally, the frozen egg filling may have been pre-cooked before having been placed on the batter. The filling may be supported by the surface tension of the batter (i.e., float) or the filling may partially or completely sink into the filling. Optionally, the batter may be partially cooked before placing the frozen egg filling on the batter. The batter is then cooked.

In another embodiment, the method for preparing an egg-filled food product includes: (A) placing a first non-yeast leavened batter portion in a container and partially cooking the first batter portion; (B) placing a frozen egg filling on the partially cooked first batter portion; (C) placing a second non-yeast leavened batter portion on the egg filling; and (D) cooking the batter portions. Optionally, the egg filling may be pre-cooked before being placed on the partially cooked first batter portion.

In another embodiment, the method for preparing an egg-filled food product includes placing a frozen egg filling in a container and placing a non-yeast leavened batter portion on the egg filling. The batter is then at least partially cooked and may be fully cooked. Optionally, the frozen egg filling may have been pre-cooking before being placed in the container. The filling may remain in contact with the cooking surface of the container after the batter is added to the container. Alternatively, the batter may lift (i.e., float) the filling up from the cooking surface of the container as the batter is added to the container.

All references, patents, and/or applications cited in the specification are indicative of the level of skill of those skilled in the art to which the invention pertains, and are incorporated by reference in their entireties, including any tables and figures, to the same extent as if each reference had been incorporated by reference in its entirety individually.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as-terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

The invention claimed is:

1. A method for preparing an integrated egg-filled food product comprising:
   pre-heating a cooking container having a flat cooking surface;
   depositing in the cooking container on the flat cooking surface an at least partially cooked, frozen egg filling;
   depositing in the cooking container a non-yeast leavened batter whereby the batter covers and partially encases the egg filling and contacts the flat cooking surface;
   cooking the partially encased egg filling and batter while: maintaining a surface of the egg filling in contact with the flat cooking surface, and
   gelatinizing the batter about the egg filling to form an egg-filled food product;
   whereby the surface of the egg filling in contact with the flat cooking surface remains not encased; and
   freezing the egg-filled food product.

2. A method for preparing an integrated egg-based food product comprising:
   pre-heating a cooking container having a cooking surface;
   depositing in the cooking container on the cooking surface an at least partially cooked, frozen egg filling;
   depositing in the cooking container a non-yeast leavened batter whereby the batter covers and partially encases the egg filling and contacts the cooking surface;
   cooking the partially encased egg filling and batter while:
   maintaining a surface of the egg filling in contact with the cooking surface, and
   gelatinizing the batter about the egg filling to form an integrated food product;
   whereby the surface of the egg filling in contact with the cooking surface remains uncovered; and
   freezing the integrated food product.

3. The method of claim 2 wherein the step of depositing the frozen egg filling comprises depositing in the cooking container on the cooking surface an at least partially cooked, frozen circular shaped egg filling.

4. The method of claim 2 wherein at least part of the cooking surface is flat and the step of depositing the frozen egg filling comprises depositing in the cooking container on the flat cooking surface an at least partially cooked, frozen circular shaped egg filling.

5. The method of claim 2 wherein the step of depositing the batter comprises depositing in the cooking container a non-yeast leavened batter whereby the batter covers and partially encases the egg filling, contacts the cooking surface, and forms a circular shape.

6. The method of claim 2 wherein the step of depositing the batter comprises depositing in the cooking container a non-yeast leavened batter whereby the batter covers and partially encases the egg filling, contacts the cooking surface, and forms a circular shape of diameter from about 10 cm (about 2 in.) to about 20 cm (about 8 in.).

7. The method of claim 2 wherein the step of depositing the batter comprises depositing in the cooking container a non-yeast leavened batter whereby the batter covers and partially encases the egg filling, contacts the cooking surface, forms a circular shape of diameter from about 10 cm (about 2 in.) to about 20 cm (about 8 in.) and thickness about 12 mm (about 0.5 in.) to about 100 mm (about 4 in.) at about the center.

8. The method of claim 2 wherein the step of cooking the partially encased egg filling and batter comprises cooking the partially encased egg filling and batter while:
   maintaining a surface of the egg filling in contact with the cooking surface, and
   gelatinizing the batter about the egg filling to form an integrated food product being an open face egg sandwich.

9. The method of claim 2 wherein the cooking surface is flat and the depositing steps comprise: depositing in the cooking container on the flat cooking surface an at least partially cooked, frozen egg filling; and depositing in the cooking container a non-yeast leavened batter whereby the batter covers and partially encases the egg filling and contacts the flat cooking surface.

10. The method of claim 2 wherein the pre-heating step comprises pre-heating a cooking container having a cooking surface such that the cooking surface is heated to about 205 degrees C. (about 400 degrees F.).

11. The method of claim 2 wherein the step of depositing the egg filling comprises depositing in the cooking container on the cooking surface an at least partially cooked, frozen simulated egg patty.

12. The method of claim 2 wherein the step of depositing the egg filling comprises depositing in the cooking container on the cooking surface an at least partially cooked, frozen egg filling having a pH about 6.6 plus or minus 0.1.

13. A method for preparing an integrated egg-based food product comprising:
pre-heating a cooking container having a cooking surface;
depositing in the cooking container on the cooking surface an at least partially cooked, frozen egg filling so that a contacting portion of the filling contacts the cooking surface;
depositing in the cooking container a non-yeast leavened batter whereby the batter covers the egg filling excluding the contacting portion and the egg filling contacting portion remains in contact with the cooking surface;
cooking the egg filling and batter while:
maintaining the egg filling contacting portion in contact with the cooking surface, and
gelatinizing the batter about the egg filling to form an integrated food product whereby the contacting portion of the egg filling in contact with the cooking surface remains uncovered by the gelatinizing batter; and
freezing the integrated food product.

14. The method of claim 13 wherein the gelatinizing step comprises gelatinizing the batter about the egg filling to form an integrated food product whereby the contacting portion of the egg filling in contact with the cooking surface remains uncovered by the gelatinizing batter to form an integrated food product being an open face egg sandwich.

* * * * *

UNITED STATES PATENT AND TRADEMARK OFFICE
CERTIFICATE OF CORRECTION

PATENT NO. : 8,343,563 B2  
APPLICATION NO. : 13/011534  
DATED : January 1, 2013  
INVENTOR(S) : Brent Preppernau et al.

Page 1 of 1

It is certified that error appears in the above-identified patent and that said Letters Patent is hereby corrected as shown below:

Title Page, Item (56)

On page no 2, column 1, under "OTHER PUBLICATIONS", line 10, delete "PCT/US2001/020180" and insert -- PCT/US2011/020180 --, therefor.

On page no 2, column 2, under "OTHER PUBLICATIONS", line 36, delete "Brat" and insert -- Brot --, therefor.

On page no 2, column 2, line 39, under "OTHER PUBLICATIONS", delete "rnethylcellulose," and insert -- methylcellulose, -- therefor.

On page no 2, column 2, line 69, under "OTHER PUBLICATIONS", delete "/8F450BD-B121-47C7-887C-OB608583C971/0/" and insert -- /8F450DBD-B121-47C7-887C-OB60B583C971/0/ --, therefor.

On page no 3, column 1, line 6, under "OTHER PUBLICATIONS", delete "KOPLAN5KIJ.," and insert -- KOBYLANSKI, J,. --, therefor.

On page no 3, column 1, line 7, under "OTHER PUBLICATIONS", delete "hydroxyproylmethvicellulose" and insert -- hydroxyproylmethyicellulose --, therefor.

On page no 3, column 2, line 16, under "OTHER PUBLICATIONS", after "The Role of" insert -- Xanthan Gum in --.

Signed and Sealed this  
Nineteenth Day of March, 2013

Teresa Stanek Rea  
*Acting Director of the United States Patent and Trademark Office*